July 1, 1952  F. M. McBETH  2,601,823
FOOD COOKING APPARATUS
Filed March 16, 1948  3 Sheets-Sheet 1

INVENTOR.
FREEMAN M. McBETH
BY
*E. F. Salter*
ATTORNEY

July 1, 1952 F. M. McBETH 2,601,823
FOOD COOKING APPARATUS
Filed March 16, 1948 3 Sheets-Sheet 2
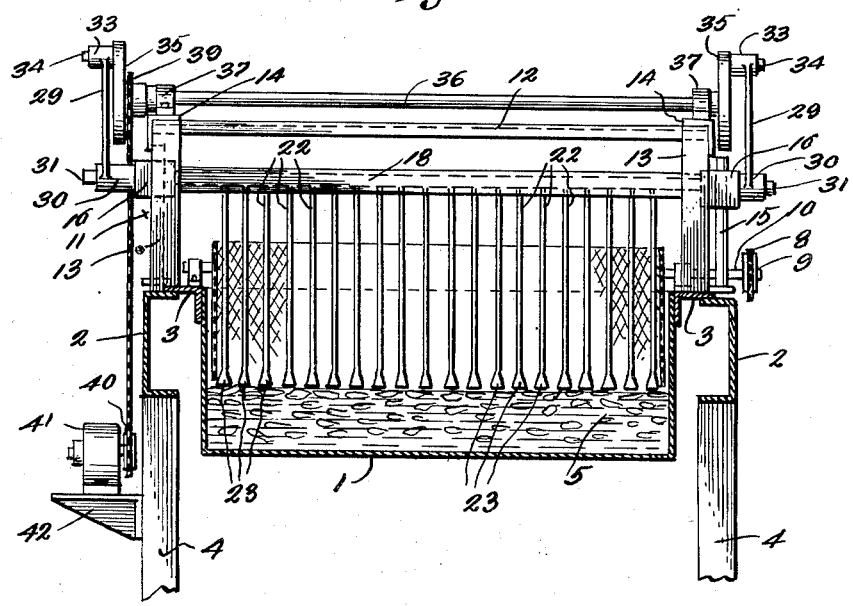
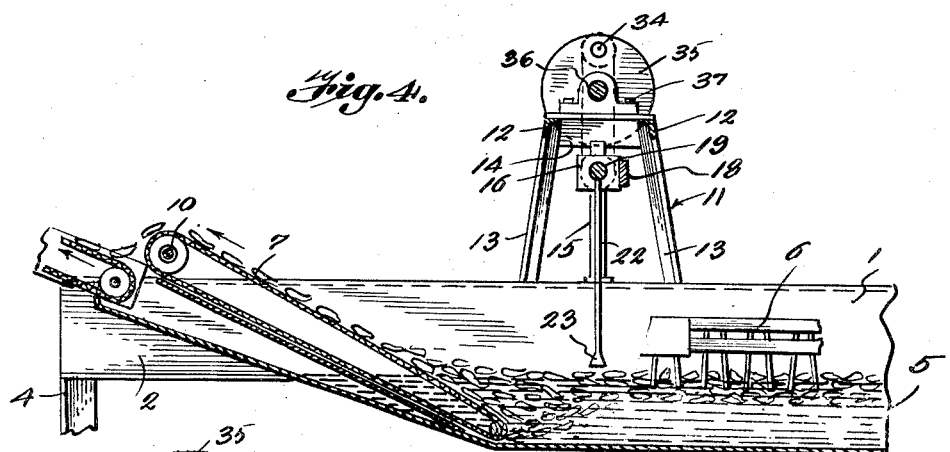
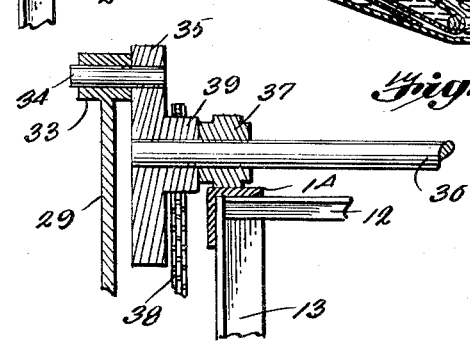
INVENTOR.
FREEMAN M. McBETH
BY
ATTORNEY July 1, 1952 F. M. McBETH 2,601,823
FOOD COOKING APPARATUS
Filed March 16, 1948 3 Sheets-Sheet 3
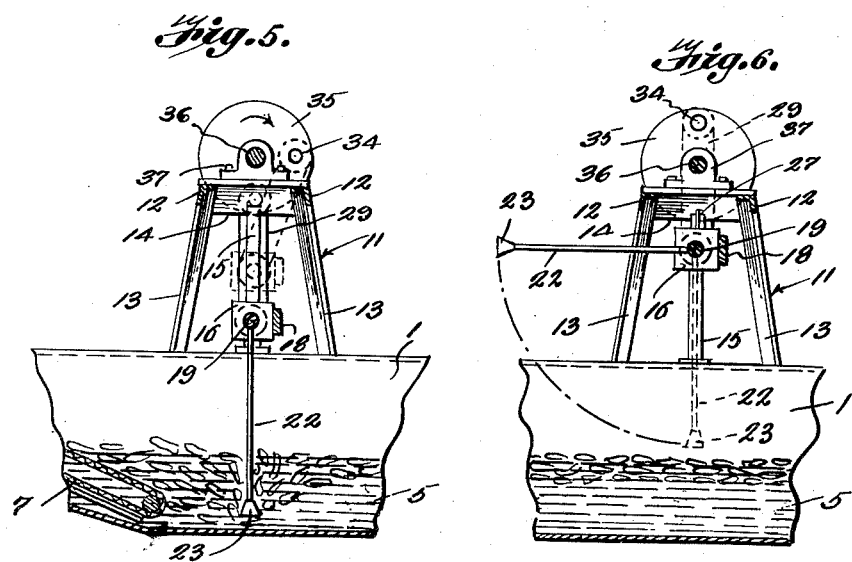
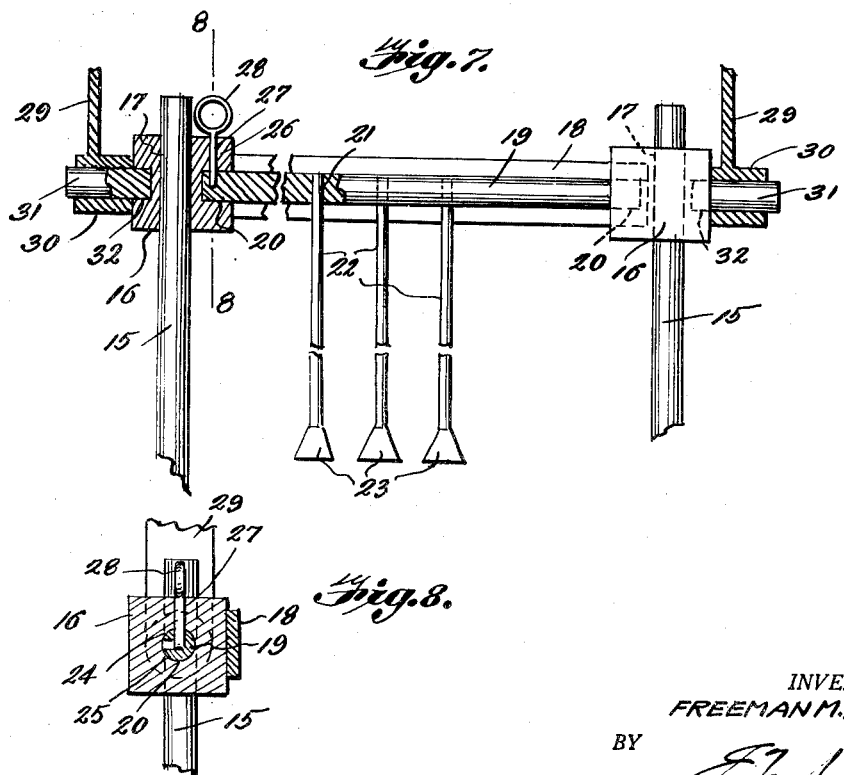
INVENTOR.
FREEMAN M. McBETH
BY
ATTORNEY Patented July 1, 1952

2,601,823

UNITED STATES PATENT OFFICE 2,601,823

FOOD COOKING APPARATUS

Freeman M. McBeth, Harrisburg, Pa., assignor to Macbeth Engineering Corporation, Harrisburg, Pa., a corporation of Pennsylvania Application March 16, 1948, Serial No. 15,215

3 Claims. (Cl. 99—406)

This invention relates to a food cooking apparatus of the continuous type wherein foodstuffs, such as potato slices or chips, are deposited into one end of a liquid cooking bath and moved through the bath and out of the other end thereof.

It is customary in machines of this character to heat the cooking bath in such a manner that the temperature thereof will be highest at the inlet or food receiving end thereof and gradually diminishes from the inlet end to the outlet end. The bath is thus maintained in a state of ebullition of gradually diminishing force from the point of inlet of the food particles in the direction of their point of removal, whereby the food particles are physically moved by the resulting convection currents in the bath from their point of inlet to their point of outlet. To control the movement of the food particles carried by the convection currents mechanical means such as rake-like impellers are employed. U. S. Patent No. 2,056,845, issued October 6, 1936, to Joseph D. Ferry, discloses a machine of the type to which reference is made.

It has been found that some of the potato chips produced by such an apparatus have soft spots, that is, are not thoroughly cooked. This is due primarily to the fact that some of the potato slices or chips escape the full control of the mechanical means or rakes and are carried through the cooking liquid too rapidly by the convection currents.

Therefore, an important object of the present invention is to provide a continuous cooker with a submerging mechanism adjacent the outlet or discharge end thereof to submerge or dunk the potato slices or chips as they approach the discharge conveyor to such an extent that a final cooking in the hot oil will take place and all portions of the potato slices or chips thoroughly cooked before they reach the discharge conveyor.

Another object of the invention is to provide a submerging device of such construction that it may be readily applied to cooking apparatus now in use.

A further object is to provide a submerging device having fingers or plungers spaced from one another transversely of the frying kettle and of such formation that they will serve very effectively to submerge or dunk the potato chips and at the same time will not break the chips.

Other objects and advantages will be apparent from the following description when considered in connection with the accompanying drawings, wherein:

Figure 3 is a transverse sectional view taken along the line 3—3 of Figure 2.

Figure 4 is a longitudinal sectional view taken along the line 4—4 of Figure 1.

Figure 5 is a fragmentary longitudinal sectional view showing the fingers or plungers of the submerger in an operative position and at the bottom of their downward movement in the oil in the frying kettle.

Figure 6 is a view similar to Figure 5 showing the operative position of the fingers of the submerger by dotted lines and the inoperative position thereof in full lines.

Figure 7 is a fragmentary view upon an enlarged scale, partially in elevation and partially in section, showing the mounting for the shaft or rod carrying the fingers and a part of the means for vertically reciprocating the fingers.

Figure 8 is a sectional view taken along the line 8—8 of Figure 7.

Figure 9 is a fragmentary sectional view upon an enlarged scale taken along the line 9—9 of Figure 2.

Figure 1:
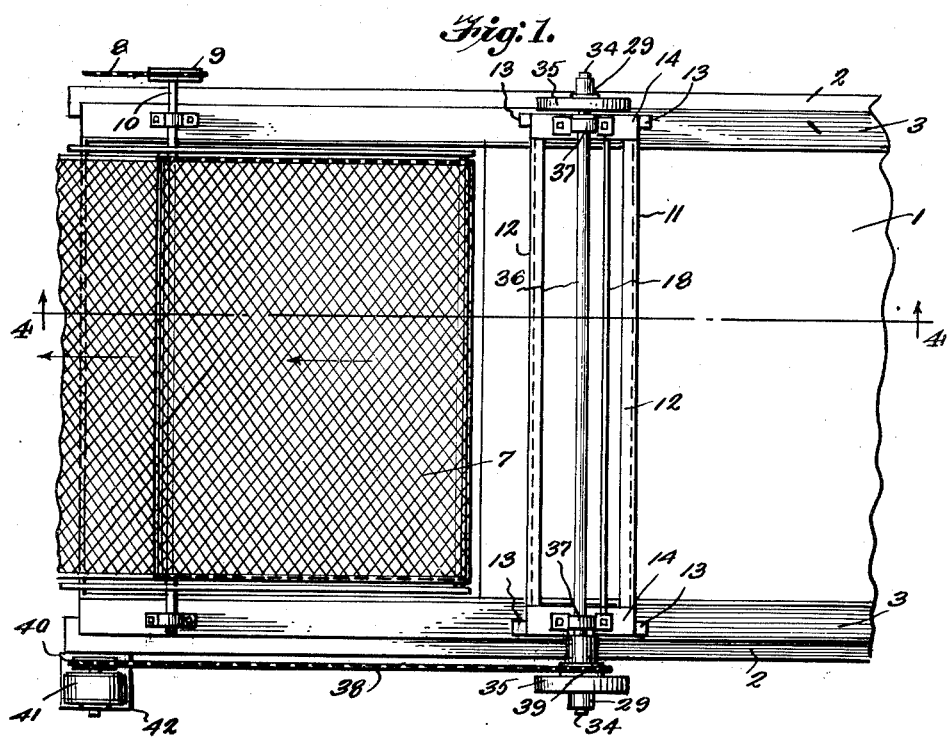
Figure 1 is a fragmentary top plan view showing the improved submerger in place over the discharge end portion of a cooking or frying kettle.
Figure 2:
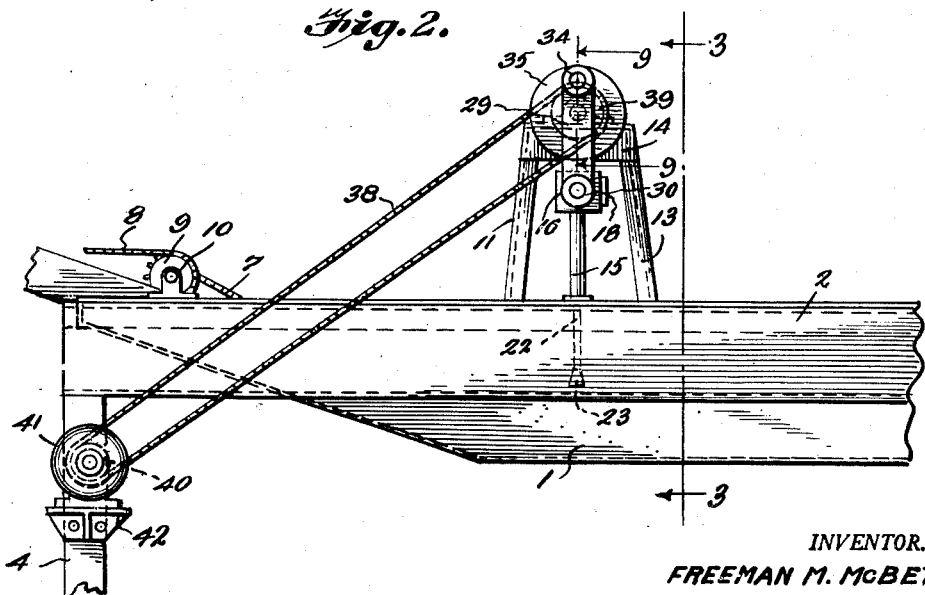
Figure 2 is a fragmentary side elevation of the kettle and submerger shown in Figure 1.

The submerger or dunking device is mounted across the frying kettle 1 near the discharge end thereof. The kettle 1 is mounted between side bars 2 by angle bars 3 which project laterally from opposite sides of the kettle and rest upon the bars 2 which are supported by legs 4. The frying kettle 1 is partially filled with cooking liquid or oil 5 which is heated in the usual manner and potato slices are deposited in the inlet end of the oil bath and moved longitudinally therein in a step-by-step fashion by rake-like impellers 6 toward the rear or outlet end of the kettle where they are removed from the cooking bath by a discharge conveyor 7. The conveyor 7 is formed of foraminous material and is driven by a chain 8 trained about a sprocket 9 carried by the shaft 10 of the conveyor. The construction thus far described is disclosed in the aforementioned Ferry patent.

The improved submerging mechanism has a frame 11 which extends across the kettle near the rear or discharge end thereof. This frame has spaced parallel side bars 12 formed of angle metal and having their ends welded or otherwise secured to legs 13 which rest upon and are secured in any suitable manner to the flanges 3 of the kettle. The upper ends of the legs 13 and the side bars 12 are connected by bridging bars 14 formed of angle metal and welded to the legs and the side bars. The frame will, therefore, be of sturdy construction. It extends upwardly from the kettle across which it is disposed. Each end of the frame carries a vertically extending guide rod 15 and the lower ends of these rods rest upon and are secured to the flanges 3 of the kettle. Vertically slidable upon the rods 15 are blocks 16 which are formed with bores 17 to receive the rods. The blocks 16 are connected with each other by a bar 18 which provides for their simultaneous movement along the rods. A rod or bar 19 extends between the blocks 16 and has its ends secured in sockets 20 bored from the inner side faces of the blocks. The rod 19 is formed at longitudinally spaced intervals with openings or sockets 21 in which the upper ends of fingers or plungers 22 are mounted. By reference to Figure 3 it will be seen that the series of fingers or plungers extend approximately the full width of the frying kettle. The lower ends of the fingers are formed with substantially conical heads 23 so that when the fingers are moved downwardly they will have relatively broad contact with the potato chips and carry the same downwardly in the hot cooking bath, as shown in Figure 5, without breaking the same. At the same time, the substantially conical shape of the heads will prevent adherence of the chips thereto upon the upstroke of the fingers.

As clearly shown in Figure 8, the rod 19 is formed with sockets 24 and 25 extending radially of the rod at right angles to each other and adapted to selectively receive a pin or key 27 disposed in a bore 26 in the block 16. The key has an eye 28 at its upper end constituting a finger hold by means of which the key may be grasped when it is to be thrust into place or withdrawn. When the key is engaged in the socket 24 of the rod 19 the fingers 22 will extend downwardly from the rod in an operative position for entering the oil, and when the key is withdrawn and the rod turned to a position allowing the key to enter the socket 25 the fingers will extend horizontally or occupy an inoperative position. See Figure 6. Thus, the attendant of the cooker may readily adjust the submerger to render it operative or inoperative.

The plungers 22 are reciprocated vertically by pitman rods or links 29 which have their lower ends formed with sleeves 30 fitted freely about stub shafts 31 mounted in sockets 32 bored from the outer side faces of the blocks 16. The upper ends of the pitman rods are formed with sleeves 33 which fit freely about stub shafts 34 projecting outwardly from crank disks 35 carried by a shaft 36. Since the stub shafts 34 are located near the peripheries of the disks 35, the pitman rods or links will impart reciprocating movement to the blocks 16 along the vertically extending rods 15 and when the fingers or plungers are in operative position their lower ends will be moved into and out of the oil. On the down stroke of the plungers, the potato slices or chips will be carried downwardly in the oil toward the bottom of the kettle. The completely cooked chips, which are highly buoyant, will immediately return to the surface of the oil and quickly move toward and onto the discharge conveyor. However, those having soft spots and consequently less buoyancy will be relatively slow in rising and by the time they return to the surface of the oil and reach the discharge conveyor they will be thoroughly cooked.

With further reference to the means by which reciprocatory movement is imparted to the plungers, it will be observed that the shaft 36 is rotatably mounted through bearings 37 carried by the bridging bars 14 and rotary motion is imparted to this shaft by a sprocket chain 38 trained about a sprocket wheel 39 which may be formed integral with one of the disks 35, as shown in Figure 9, or may be separate therefrom and fixedly secured upon the shaft 36. The chain 38 is also trained about a sprocket wheel 40 upon the shaft of a driving motor 41 mounted upon a bracket 42 carried by one of the legs 4.

What I claim is:

1. In combination with a cooker having a frying kettle and impelling mechanism for moving foodstuffs through a body of hot oil in the kettle toward a discharge conveyor at one end of the kettle; a submerging mechanism independent of said impelling mechanism mounted over the kettle including members mounted for reciprocating movement vertically into and out of the hot oil between the impelling mechanism and the discharge conveyor, means providing for the upward swinging of said members to an inoperative position in which they are disposed above the oil and the foodstuffs therein, and means for securing said members in their inoperative position.

2. A submerger of the character described comprising a frame adapted to be mounted over a frying kettle transversely thereof, a rod extending horizontally in said frame and mounted for vertical reciprocating movement in the frame, plungers carried by said rod, the rod being mounted for turning adjustment from a position in which the plungers are vertically disposed to a position in which they extend horizontally, means for securing the rod in adjusted position, and means for imparting vertical reciprocating movement to said rod.

3. A submerger of the character described comprising a frame adapted to be mounted over a frying kettle transversely thereof, vertical guides carried by said frame, blocks slidable vertically along said guides, a rod extending between and connecting said blocks, means for imparting reciprocating movement to said blocks vertically along said guides, and plungers carried by said rod for entering oil in the frying kettle and imparting dunking movement to foodstuffs cooking in the oil as the rod moves downwardly, said plungers having enlarged heads for engaging the foodstuffs.

FREEMAN M. McBETH.

REFERENCES CITED

The following references are of record in the file of this patent:

UNITED STATES PATENTS

| Number | Name | Date |
|---|---|---|
| 219,486 | King | Sept. 9, 1879 |
| 1,209,094 | Williams | Dec. 19, 1916 |
| 1,275,628 | Thompson | Aug. 13, 1918 |
| 1,928,440 | Simons | Sept. 26, 1933 |
| 2,056,845 | Ferry | Oct. 6, 1936 |
| 2,130,082 | Ferry | Sept. 13, 1938 |
| 2,150,273 | Ferry | Mar. 14, 1939 |
| 2,170,775 | Ferry | Aug. 22, 1939 |
| 2,174,555 | Ferry | Oct. 3, 1939 |
| 2,176,624 | Ferry | Oct. 17, 1939 |
| 2,251,111 | Brown | July 29, 1941 |